United States Patent [19]

Ditcher

[11] Patent Number: 4,508,355

[45] Date of Patent: Apr. 2, 1985

[54] GASKET SUITABLE FOR USE IN SEALING EXTERIOR OF SEWER PIPE TO OPENING IN MANHOLE, AND METHOD AND SYSTEM EMPLOYING SAME

[75] Inventor: John Ditcher, Langhorne, Pa.

[73] Assignee: A-Lok Products Corporation, Trenton, N.J.

[21] Appl. No.: 472,620

[22] Filed: Mar. 7, 1983

[51] Int. Cl.³ .......................... F16L 21/02; F16J 15/32
[52] U.S. Cl. .................................. 277/189; 277/34.3; 277/207 A
[58] Field of Search ............ 277/207 A, DIG. 2, 226, 277/34.3, 1, 189

[56] References Cited

U.S. PATENT DOCUMENTS

| | | | |
|---|---|---|---|
| 2,259,940 | 10/1941 | Nathan | 277/207 A |
| 2,369,911 | 2/1945 | Lind et al. | 277/226 |
| 2,607,966 | 8/1952 | Beck | 277/226 |
| 3,647,229 | 3/1972 | Grimes | 277/207 A |
| 4,159,829 | 7/1979 | Ditcher | 277/34.3 |

Primary Examiner—Robert I. Smith
Attorney, Agent, or Firm—William H. Elliott, Jr.; Albert L. Free

[57] ABSTRACT

A circular gasket for sealing the opening between the exterior of a sewer pipe and the interior periphery of an opening in a manhole, in which greater sealing pressure is provided by using a plurality of longitudinal openings extending entirely around the gasket through the head portion thereof which contacts the sewer pipe.

1 Claim, 8 Drawing Figures

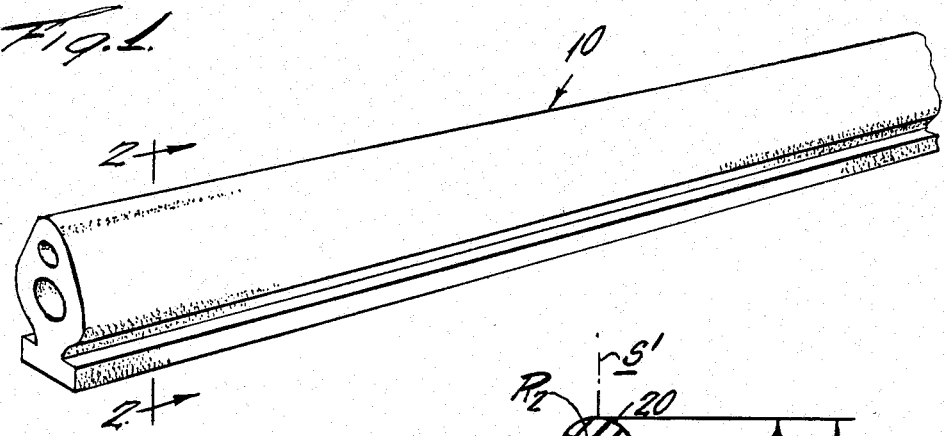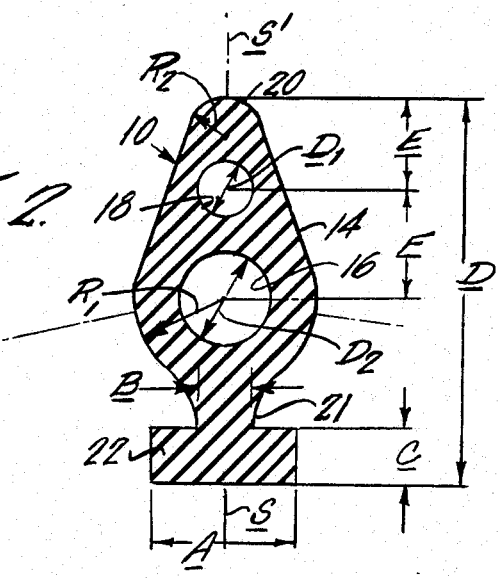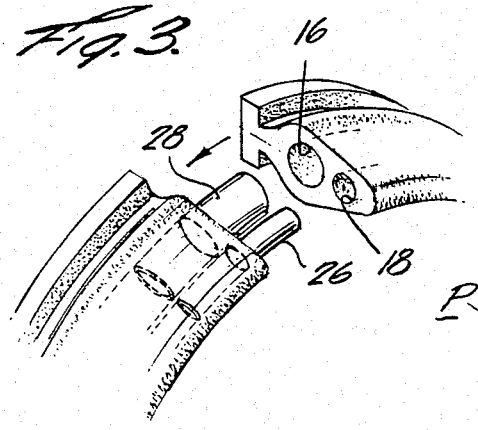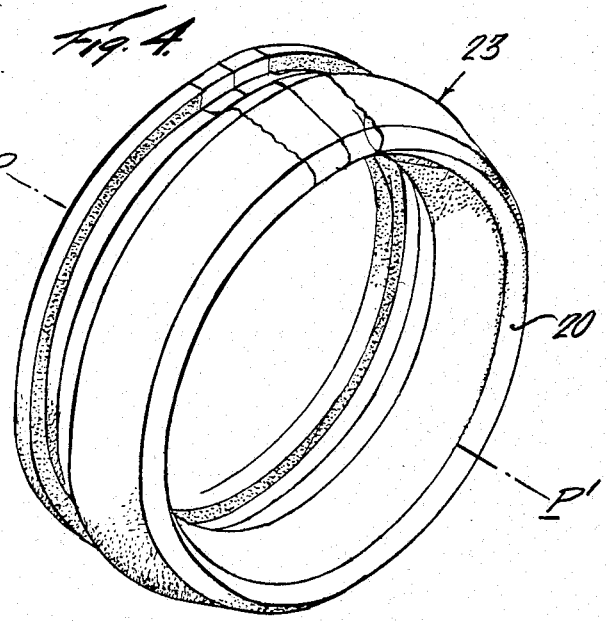

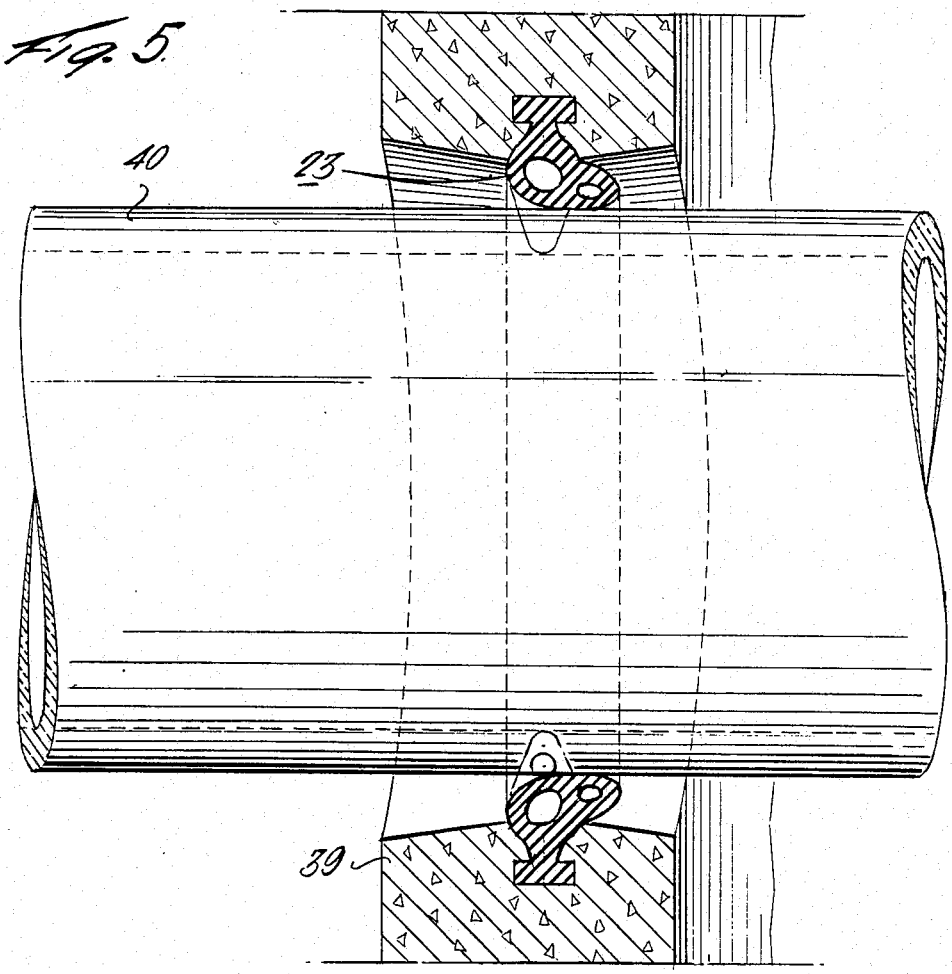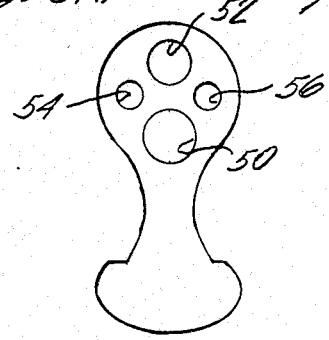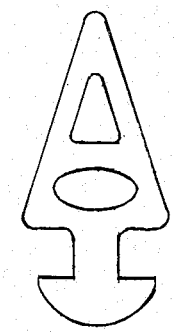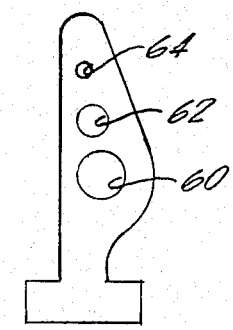

GASKET SUITABLE FOR USE IN SEALING EXTERIOR OF SEWER PIPE TO OPENING IN MANHOLE, AND METHOD AND SYSTEM EMPLOYING SAME

This invention relates to an improved gasket for sealing the space between a sewer pipe and the inner periphery of an opening in the wall of a manhole through which the pipe passes. It also relates to a method for making and installing such a gasket, as well as to a system including same.

The new form of gasket represents an improvement in the structure and method described and claimed in my U.S. Pat. No. 4,159,829 entitled "Gasket Seal Between Sewer Pipe and Manhole Opening", issued July 3, 1979, and my U.S. Pat. No. 4,073,048 entitled "Gasket Seal Between Sewer Pipe and Manhole Opening" issued Feb. 14, 1978.

More particularly, the gasket and method of manufacture described in my above-identified patents have been used successfully to seal the exterior of a sewer pipe to the periphery of a corresponding opening in the side of a manhole. The gasket described in said patents is preferably formed from a linear extrusion of elastomeric material which has a solid head portion or a head portion containing a single continuous cavity extending throughout its length, a foot portion, and a neck portion connecting the head portion to the foot portion, the extrusion having a uniform cross-section. The linear extrusion is curved into a cylindrical shape and its opposite ends appropriately bonded together to form a cylindrical gasket device in which the axis of the head portion extends parallel to the gasket cylinder. During installation, the gasket is held in a special mold while the manhole is being cast so that the foot portion, neck portion and a small part of the head portion will be embedded in the cementitious material around the periphery of the manhole opening and the gasket device flexed and distorted so that the head portion is directed substantially radially inwardly, normal to the axis of the sewer pipe to be inserted into the opening formed by the gasket. Suitable molds and procedures are described and claimed in my U.S. Pat. No. 3,796,406 entitled "Gasket Seal Between, Sewer Pipe And Manhole Opening" and issued Mar. 12, 1974. See also my U.S. Pat. Nos. 4,073,048 and 4,159,829 identified above, the relevant disclosures of which are included herein by reference. After the casting of the manhole is complete, the sewer pipe is advanced into the central opening in the gasket, whereby a seal is provided to prevent liquid flow between gasket and pipe.

One principal feature of the gasket of my above-identified patents lies in the particular nature and shape of the head portion of the gasket. More particularly, the head portion is substantially pear-shaped in cross-section and as mentioned above preferably contains a cavity extending longitudinally entirely through and around the circular gasket, to lend resiliency to it. For sewer pipes which are not seriously out of round, and where moderate sealing pressure are adequate, the above-described gasket of my earlier 4,159,829 patent functions very well. However, where the pipe is seriously out of round, or when unusually high sealing pressures are needed, it has been found desirable to increase the strength or tightness of the seal, so that the gasket will bear against the entire circumference of the pipe with sufficient pressure to maintain the desired sealing action and thus prevent water leakage through the seal.

My above-identified '829 patent also suggests that, in difficult cases, one may increase the tightness of the seal by injecting a non-hardening, self-sealing material into the circular cavity, using a syringe with a fine point for this purpose. The material injected is placed under sufficient pressure to expand the tubular head into firm contact with the pipe. This is a procedure which one would rather not have to perform, and it would instead be desirable to provide a gasket which, even in quite difficult applications, would accomplish the desired tight sealing even over regions of the pipe which are quite seriously out of round, without requiring such injection, while at the same time enabling use of the injection method if it should be necessary in an extreme case.

Accordingly, it is an object of the invention to provide a new and improved gasket, gasket assembly and method of fabrication thereof.

Another object is to provide such a gasket which is resilient but is still stable in position and configuration when installed, and which provides a tight seal all around the circumference of the pipe.

Another object is to provide such an article of manufacture and gasket which can readily be made by extrusion or molding.

A further object is to provide such article and gasket which in most cases can be used successfully without requiring injection of a self-sealing material, but which can readily be used with the injection procedure.

SUMMARY OF THE INVENTION

These and other objects of the invention are achieved by the provision of a gasket which differs from that of my above-identified '829 patent principally in that it contains a plurality of cavities extending longitudinally through the head portion thereof, rather than a single opening. Such a construction enables the provision of the desired degree of resilience, while at the same time providing improved stability of gasket configuration to enable a stronger and more uniform seal all around the exterior of the sewer pipe, even in regions which may be seriously out-of-round.

With this arrangement of plural cavities through the head portion, it has been found that the injection of a non-hardening, self-sealing material into either of the circular cavities as described in my above-identified patent is generally not necessary, although in extreme cases this procedure may be desirable and is easily practiced. Furthermore, if desired one may inject such a material or materials into one or both circular cavities to control the characteristics of the gasket.

BRIEF DESCRIPTION OF FIGURES

These and other objects and features of the invention will be more readily understood from a consideration of the following detailed description, taken in connection with the accompanying drawings, in which:

FIG. 1 is a perspective view of an article of manufacture usable as a gasket in accordance with the invention, and analogous to the article of manufacture of FIG. 2 of my '829 patent identified above;

FIG. 2 is a cross-sectional view of the article of FIG. 1, analogous to FIG. 3 of my '829 patent;

FIG. 3 is a fragmentary perspective view showing the article of manufacture of FIG. 1 as it is about to be formed into a circular gasket, analogously to FIG. 4 of my '829 patent;

FIG. 4 is a perspective view of the completed gasket, analogous to FIG. 5 of my '829 patent;

FIG. 5 is a fragmentary, vertical sectional view, with parts shown in full, of a completed installation of a sewer pipe in an opening in a manhole, using a gasket in accordance with the invention to provide a seal between the sewer pipe and the inner periphery of the opening in the side wall of the manhole; and FIGS. 6A-C are cross-sectional views, similar to FIG. 2, of other possible configurations of elastomeric gasket which might be used in accordance with the present invention.

DETAILED DESCRIPTION OF PREFERRED EMBODIMENTS

Turning now to the specific embodiment of the invention shown in the drawings by way of example, and referring first particularly to FIGS. 1 and 2, the gasket strip 10 is preferably formed by a continuous extrusion of a synthetic elastomeric material such as that known as polyisoprene, although it may instead be made by a conventional molding process.

The extrusion 10 has a head portion 14; at present I prefer to use a shape for the head portion which is substantially as shown in FIG. 2, the exterior of which is somewhat similar to the pear-shaped head portion shown in the gasket of FIG. 3 of my '829 patent although it differs slightly in precise exterior shape, as shown, having an arrowhead or triangular shape with all three corners rounded. In this example of the invention, the longitudinal cavities are two in number, consisting of a larger cavity 16 of circular form and a smaller circular cavity 18 located between the larger cavity 16 and the tip 20 of the head portion of the gasket. In this preferred embodiment the two longitudinal cavities are symmetrically located with respect to the axis of symmetry S—S' of the cross-section of the head portion of the gasket, the axis S—S' extending perpendicularly to the axis of the longitudinal cavities and through the head, neck and foot portions of the gasket.

The gasket also comprises a neck portion 21 and a foot portion 22, both small in cross-sectional area compared with the head portion, and adapted to hold the gasket securely in the cast cementitious material of the manhole as described hereinafter and in my '829 patent.

As shown in FIG. 3, after the extrusion of FIGS. 1 and 2 has been made, it is cut to the proper length so that, when formed into a circle and the ends bonded together, it will provide the desired diameter for the gasket ring 23 shown in FIG. 4. FIG. 3 shows one suitable assembly procedure wherein a pair of flexible tubes 26 and 28 are fitted into the opposed ends of the two cavities 16 and 18 to act as tubular positioning dowels while the ends are being bonded together as by vulcanizing. It has been found that in most instances such dowels are not required at all, but if they are used it is preferred that they be tubular since this tends to preserve the resilient properties of the gasket even in the region of the joint; if the dowels were made of solid material, they would of course modify the mechanical properties of the gasket in the joint region. One can also use the alignment procedure described in my '829 patent, employing an appropriate pair of solid dowel pins made of a readily-frangible material such as plaster of Paris, which can be pulverized by hammer blows after vulcanizing is complete.

In FIG. 4 the cylindrical gasket 23 has been formed in which the tip 20 of the head portion is directed parallel to the axis of the P—P' cylindrical gasket. As described in my above-identified '829 patent, this cylindrical gasket may be bent or deformed into the desired configuration, with the tip of the head portion extending substantially radially, by the apparatus and method described in that patent with particular reference to FIGS. 6 and 7 thereof, and the cementitious manhole then cast so that the gasket is partially embedded in it. Since the same general procedure may be utilized in the present case, neither the drawings nor the detailed description of this apparatus and process have been reproduced herein, but they are included herein by reference. Suffice it to say that the configuration of the molds utilized in this step should be such as to position the circular gasket so that its foot portion and its neck portion, as well as the lower portion of the head portion, will be embedded in the surrounding cementitious material as desired, with the head portion extending substantially radially inwardly from the periphery of the opening in the manhole, at the desired angle.

When the diameter of the sewer pipe is small compared with that of the manhole, e.g. a 12" pipe is to be inserted in an opening in an 60" diameter manhole, the gasket may be deflected so that all parts of the head portion are directed radially inwardly, since it will then be directed at right angles to the axis of the pipe prior to the sliding of the pipe into the center opening provided by the gasket, as desired. However, when the diameter of the sewer pipe is larger compared with the manhole, e.g. when a 30" sewer pipe is to be inserted into an opening in a manhole 60" in diameter, the opening in the manhole will be distinctly non-circular; the mold of FIG. 1 of my '829 or '406 patent, both identified fully above, should then be shaped to force the gasket to conform with the actual non-circular periphery of the opening in the manhole, while holding the gasket head portion so that it extends parallel to the axis of the manhole and at right angles to the axis of the pipe just prior to its insertion, until the manhole has been cast and has solidified.

FIG. 5 hereof is analogous to FIG. 8 of my above-identified patent, showing the wall 39 of the completed cast manhole with the gasket 23 in situ, after the sewer pipe 40 has been slid through the center of the gasket into the final rest position shown, it being understood that the sewer pipe will normally be supported on its undersurface by the earth or by appropriate supports fixed in the earth, so that the entire weight of the pipe will normally not rest upon the lower portion of the gasket. The gasket will then be deflected as shown, to provide a good strong seal entirely around the entire circumference of the sewer pipe, even in regions where there are defects in the exterior surface of the sewer pipe, including rather serious out-of-round conditions. It has been found that the gasket of the present invention, when suitably sized with respect to the related and associated sewer pipe, will provide the desired strong pressure for preventing any substantial leakage of liquids through the seal. This improvement occurs because the plurality of longitudinal cavities in the gasket reduce the material present in the gasket sufficiently to provide the desired resilience yet, because the transverse web between the cavities provide lateral stability to the structure, the configurational integrity and the desired function of the gasket are retained despite the large forces exerted on the gasket by the sewer pipe.

It is noted that the larger longitudinal cavity through the head portion of the gasket is located at and just outside the surface of the cement of the wall opening. Accordingly, if it should be required, the above-mentioned filling of the gasket with an expandable filler may be accomplished by guiding the hypodermic syringe along the surface of the wall opening and into the larger cavity; preferably, only the larger cavity is thus filled.

FIGS. 6A–6C show some of the variations in configuration of head portion and longitudinal cavities which might be employed; while the foot portion and the neck portion in such embodiments may be as in FIG. 2, the plural-cavity head structure of the invention may be used with other foot and neck configurations as shown in FIGS. 6A–6C, albeit with performance less desirable than for the gasket of FIG. 2.

More particularly, FIG. 6A shows a cross-section of another possible form of the gasket in which the foot portion and the neck portion merge into each other in curved fashion, rather than angularly, in which the head portion is more nearly circular or oval than in FIG. 2, and in which there are four longitudinal cavities or cavities 50, 52, 54 and 56, two of one diameter and two of another diameter.

FIG. 6B shows a cross-section of another possible form of gasket for the present purposes, again with a somewhat different shape of foot portion, a more angular head portion, and two cavities one of which is substantially elliptical and the other of which is substantially triangular.

FIG. 6C shows the cross-section of another possible form of gasket for the present purposes which is not symmetrical with respect to any vertical line through it, and instead is substantially straight along one side and substantially convex along the other side; it contains three cavities 60, 62 and 64 of progressively smaller diameters in the direction of the tip thereof, all of which are somewhat to one side of the axis of symmetry of the foot portion.

The variations in the form of the gasket shown in FIGS. 6A–6C are merely by way of illustrating that at least some of the advantages of the invention can be obtained by use of gaskets which are quite different in form from the particular one used in the preferred embodiment of the invention, but which utilize the feature that there is more than one longitudinal cavity through the head portion. However, applicant has found that the gasket of the preferred embodiment of FIGS. 1 and 2 is especially effective for achieving his intended purposes.

In a preferred form of the invention, the dimensions indicated by letters in FIG. 2 may have the following values, for a gasket strip to be used with a sewer pipe of 12" diameter inserted into a manhole of 40" or 60" diameter:

A = 1.00 inch
B = 0.375 inch
C = 0.375 inch
D = 2.625 inch
E = 0.625 inch
F = 0.750 inch
$R_1 = \frac{5}{8}$ inch radius
$R_2 = \frac{1}{4}$ inch radius
$D_1 = \frac{3}{8}$ inch
$D_2 = \frac{5}{8}$ inch This leaves sidewall thicknesses of about 5/16" adjacent the large cavity and of about 3/16" adjacent the smaller cavity, a tip portion which is about 7/16" long measured outwardly from the smaller cavity, and a transverse web or rib between the cavities 16 and 18 which separates the cavities by about $\frac{1}{4}$" and which provides structural strength and ridigity for the head portion of the gasket.

The above dimensions are merely by way of example, and may be scaled up or down from those specifically set forth, preferably in substantially direct proportion to the diameter of the sewer pipe with which the gasket is used.

While the invention has been described with particular reference to specific embodiments thereof in the interest of complete definiteness, it will be understood that it may be embodied in a variety of forms diverse from those specifically shown and described without departing from the spirit and scope of the invention as defined by the appended claims.

I claim:

1. In a manhole system comprising a manhole having a generally circular wall opening surrounding the outer surface of a generally cylindrical pipe extending through said opening, and a gnerally circular gasket ring of elastomeric material having a uniform cross-section along its circumferential length and comprising a radially-outward foot portion embedded in the wall of said manhole surrounding said opening, a head portion radially inward of said foot portion and bearing against the exterior of said pipe, and a neck portion between said head and foot portions of lesser width than either of them and also embedded in said wall, the radially inward tip of said head portion when undeflected defining a circle of lesser radius than that of the outer surface of said pipe so that when said pipe is inserted into said opening said gasket is deflected axially of said pipe and the side surface of said head portion bears sealingly against said outer surface of said pipe, said head portion tapering from a greater lateral thickness near said neck portion to a smaller thickness near said tip:

the improvement wherein said head portion contains a first cavity and a second cavity each of circular cross-section and spaced radially from each other to define a transverse wall between them, each of said cavities extending completely around the circumference of said gasket, said first cavity being nearer said neck portion and a larger cross-sectional diameter than said second cavity.

* * * * *

UNITED STATES PATENT AND TRADEMARK OFFICE
CERTIFICATE OF CORRECTION

PATENT NO. : 4,508,355
DATED : April 2, 1985
INVENTOR(S) : John Ditcher

It is certified that error appears in the above-identified patent and that said Letters Patent is hereby corrected as shown below:

Column 1, line 45, delete the comma following "Between" so that the title portion reading "Between, Sewer" reads --Between Sewer--.

Column 1, line 61, "pressure" should read --pressures--.

Column 4, line 65, "provide" should read --provides--.

Column 5, lines 22-23, delete "or cavities" so that the section reading "cavities or cavities" reads --cavities--.

Column 6, line 32, "gnerally" should read "generally".

Column 6, line 55, "a" should be --of--.

Signed and Sealed this

Twenty-seventh Day of August 1985

[SEAL]

Attest:

DONALD J. QUIGG

Attesting Officer     Acting Commissioner of Patents and Trademarks